United States Patent [19]

Harada et al.

[11] 4,012,843
[45] Mar. 22, 1977

[54] CONCAVE DIFFRACTION GRATING AND A MANUFACTURING METHOD THEREOF

[75] Inventors: Tatsuo Harada, Fuchu; Shigeo Moriyama, Kokubunji; Toshiaki Kita, Tokyo; Hidenori Yamaguchi, Hachioji, all of Japan

[73] Assignee: Hitachi, Ltd., Japan

[22] Filed: Dec. 9, 1974

[21] Appl. No.: 531,156

Related U.S. Application Data

[62] Division of Ser. No. 463,799, May 24, 1974, abandoned.

[30] Foreign Application Priority Data

Apr. 25, 1973 Japan .................. 48-46175

[52] U.S. Cl. .................. 33/19 A
[51] Int. Cl.² .................. B43L 13/24
[58] Field of Search .............. 33/19 A, 19 R, 27 H, 33/21 R, 21 B, 22; 350/162 R

[56] References Cited

UNITED STATES PATENTS

| 2,303,299 | 11/1942 | Finn | 33/19 A |
| 3,344,526 | 10/1967 | Hursfield | 33/19 A |

OTHER PUBLICATIONS

Concave Diff. Gratings with Variable Spacing, Opt & Spectrusc (USA) vol. 28, No. 4 (Apr. 1970).
Interfer. Control of Grating Ruling etc. J.O.S.A. vol. 45, No. 2, Feb. 1955, pp. 112–121.
Concave High Aperture Diff. Grating etc. Smolkin et al.

*Primary Examiner*—Harry N. Haroian
*Attorney, Agent, or Firm*—Craig & Antonelli

[57] ABSTRACT

A tool for ruling grating grooves is reciprocated on a diffraction grating blank with the tool being restrained within a plane inclined at an arbitrary angle relative to a plane lying in contact with one point on a spherical concave of the diffraction grating blank. Translation for a variable pitch-groove spacing which changes as a function of the groove number or groove position is imparted to the diffraction grating blank in interlocking relationship with the reciprocation, thereby mechanically ruling the desired sphere of the grating blank with the grating grooves, whereby a concave diffraction grating which forms diffracted light of a specific wavelength into a completely stigmatic image at high diffraction efficiency can be manufactured.

7 Claims, 9 Drawing Figures

CONCAVE DIFFRACTION GRATING AND A MANUFACTURING METHOD THEREOF

This is a division of application Ser. No. 463,799 filed Apr. 24, 1974, now abandoned.

BACKGROUND OF THE INVENTION

The present invention relates to a diffraction grating in which a number of grating grooves are ruled on a spherical surface, and, more particularly, to improvements in a method of manufacturing a concave diffraction grating.

A concave diffraction grating is a dispersive element usually obtained by ruling rectilinear grooves which are equally spaced from and parallel to one another with respect to a plane lying in contact with a grating blank sphere at the center of a sphere. It has a light dispersion property as a diffraction grating and also a light focusing property as a concave mirror, and does not require a collimating and focusing optical element composed of a lens, a concave mirror, etc. necessary for a plane grating spectrometer. For this reason, a concave diffraction grating is indispensable in a spectrometer for the vacuum ultraviolet region in which the reflection factor on a metal surface is generally very low. In addition, it has wide applications such as the simultaneous spectral measurement of multiple wavelengths and a simple spectrometer having a small number of optical components.

However, with a spectrometer employing the prior-art concave diffraction grating in which equally-spaced and parallel rectilinear grooves are ruled with respect to a plane lying in contact with the grating blank sphere at the center thereof, it is inevitable that spectra obtained are usually attended with many aberrations, especially astigmatism. This has been considered to be a significant defect of the concave diffraction grating.

FIG. 1 shows a local curve of diffracted light where a light source is placed at the center of curvature of a prior-art concave diffraction grating. For the prior-art concave diffraction grating 9, the tangential focal curve T (in a direction perpendicular to the grooves) is a circle R, a so-called Rowland circle, which passes through the center of O' of curvature of the sphere and the center O of the diffraction grating and whose diameter is the radius OO' of curvature of the sphere. The sagittal focal curve S (in the direction parallel to the grooves) is on a straight line lying in contact with the Rowland circle R at the center of curvature. Therefore, the diffracted image of light emerging from the center of curvature is not focused on one point, and the spectrum on the Rowland circle being usually used for the spectral analysis is always attended with astigmatism.

In order to eliminate the astigmatism in the concave grating spectrometer, a number of research attempts have hitherto been made. There have been many reports including a method in which parallel rectilinear grooves are ruled on the sphere and the groove intervals are different from each other, a method in which an aspherical surface such as toroidal surface and ellipsoidal surface is employed for the grating blank, and a method in which curved grooves are formed on the sphere. In putting these into practical use, however, numerous problems have been encountered due to restrictions on the range free from aberration, technical difficulties in fabrication, etc.

On the other hand, it has become possible in recent years to fabricate a diffraction grating by the application of laser holography technology. In this method of fabrication, interference fringes by a laser beam are formed on a plane or concave surface, the interference fringes are transformed into unevenness in a photographic emulsion plate or photoresist, and a metal film is thereafter formed on its surface by, for example, vacuum evaporation. Particularly in the case of a concave diffraction grating, it has become possible to manufacture a product which has a light focusing characteristic different from that attained by the conventional mechanical ruling.

FIG. 2 shows a local curve of diffracted light in the case where a light source is placed at the center of curvature of a typical holographic concave diffraction grating.

In the holographic concave diffraction grating 9', two points at which the tangential focal curve T and the sagittal focal curve S coincide are usually present in addition to the center O' of curvature. The diffracted image of light emerging from the center O' of curvature is formed at these points completely stigmatically. Where the light source is located at any of the three points, all the diffracted images obtained at the respective points are stigmatic.

The prior-art holographic concave diffraction grating 9', however, is restricted in the diffraction wavelength and the image forming position at which a stigmatic spectrum is obtained, by the wavelength of the laser used at the manufacture. A further disadvantage is that since the sectional shape of the grating grooves is the unevenness produced from the interference fringes by the photographic treatment, there is not as free a selection of the shape of the groove section as for a mechanical ruling, which makes it impossible to achieve a high diffraction efficiency in an arbitrary wavelength region.

SUMMARY OF THE INVENTION

An object of the present invention is to obviate the restrictions and disadvantages in the prior-art concave diffraction gratings, and to manufacture a concave diffraction grating which forms a completely stigmatic diffracted image at an arbitrary specific wavelength and which achieves a high diffraction efficiency in the wavelength region.

According to the present invention, a tool for ruling grating grooves is reciprocated on a diffraction grating blank under the state in which the tool is restrained within a plane inclined at an arbitrary angle relative to a plane lying in contact with one point on a spherical concave of the diffraction grating blank; a translation for a groove spacing which changes as a function of the groove number (or the ruling number) or the groove position is imparted to the diffraction grating blank in interlocking relationship with the reciprocal motion, within the second-mentioned plane lying in contact with one point on the spherical concave, and in a direction orthogonal to an intersectional line defined by the second-mentioned plane and the first-mentioned plane inclined by the arbitrary angle relative to the second-mentioned plane; and a plurality of rules are mechanically formed in the desired sphere of the diffraction grating blank by the grating groove ruling tool, whereby a concave diffraction grating which forms diffracted light of a specific wavelength into a completely stigmatic image can be manufactured.

DESCRIPTION OF THE PREFERRED EMBODIMENTS

Figure 1:
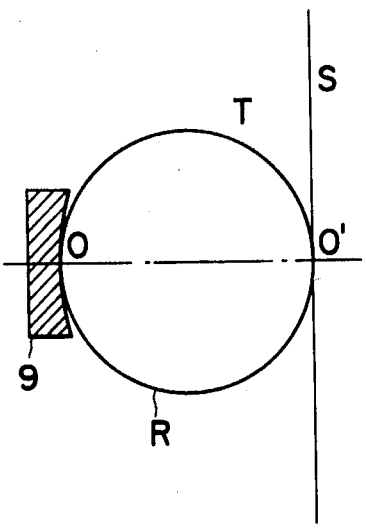
FIG. 1 is an explanatory diagram of a local curve of diffracted light in a prior-art concave diffraction grating.
Figure 2:
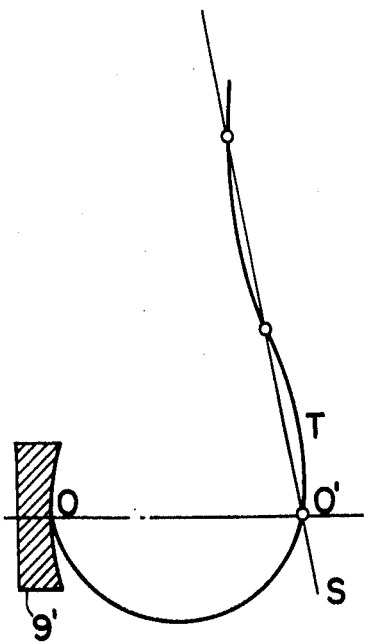
FIG. 2 is an explanatory diagram of a local curve of diffracted light in a typical holographic concave diffraction grating.
Figure 3:
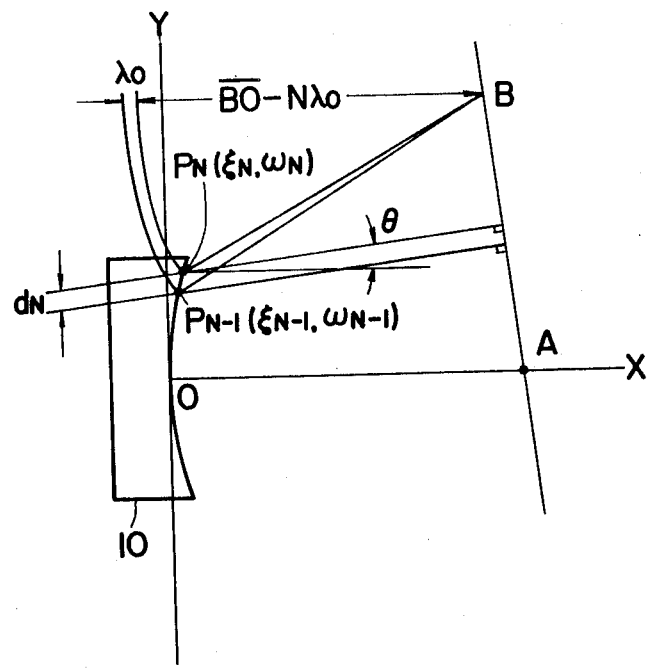
FIG. 3 is a diagram which illustrates the manufacturing principle of a concave diffraction grating of the present invention.

The groove position of a holographic concave diffraction grating in which diffracted light of a specific wavelength is formed into a completely stigmatic image is determined as follows. With reference to FIG. 3, let point O be the center of a diffraction grating 10, point A be the center of curvature of a grating blank, and point B be a point at which the image of the first-order diffracted light of a wavelength $\lambda_0$ is formed completely stigmatically when the position of a light source is the point A. Under these conditions, the position of the N-th groove counted from the origin O in a principal section containing the points A, B and O is intersection point $P_N$ between the sphere of the grating blank and a circle whose center is the point B and whose radius is $BO - N\lambda_0$. Intersection points between the grating blank sphere and a spherical surface, whose radius is $BP_N$ and whose center is B, form one grating groove, and they are the same as an intersection line between the blank sphere and a plane which contains the point $P_N$ and which is normal to a straight line AB.

Therefore, in order to mechanically rule grating grooves at the same positions as in the holographic concave diffraction grating, a tool for ruling the grating grooves is restrained within the plane normal to AB (the plane inclined by an angle $\theta$ relative to a line AO in FIG. 3), and a variable pitch translation for a groove spacing as represented by the following equation is imparted to the grating blank as to the N-th grating groove:

$$d_N = (\omega_N - \omega_{N-1}) - (\xi_N - \xi_{N-1}) \tan\theta = d_0 + \Delta_N$$

(where $d_0$ denotes the groove spacing in the middle, and $\xi_N$ and $\omega_N$ denote X and Y coordinate positions of the point $P_N$.)

Thus, a concave diffraction grating in which the diffracted light of the wavelength $\lambda_0$ is formed into a completely stigmatic image at the point B can be manufactured. The above equation is applicable, not only to the wavelength region of the prior-art holographic concave diffraction grating, but also to wavelength regions for which the holographic concave diffraction grating cannot be employed.

That is, the tool for ruling the grating grooves is reciprocated on the diffraction grating blank with the tool restrained within the plane inclined at an arbitrary angle relative to the plane lying in contact with one point on the spherical concave of the diffraction grating blank; the translation for the groove spacing which changes as a function of the groove number (or the ruling number) or the groove position is imparted to the diffraction grating blank in interlocking relationship with the reciprocation, within the second-mentioned plane lying in contact with one point on the spherical concave, and in a direction orthogonal to the intersecting line defined by the second-mentioned plane and the first-mentioned plane inclined by an arbitrary angle relative to the second-mentioned plane. A plurality of rules are mechanically formed in the desired sphere of the diffraction grating blank by the grating groove ruling tool, whereby the concave diffraction grating which forms the diffracted light of the specified wavelength into the completely stigmatic image can be manufactured. In the present invention, the expression "to mechanically form the rules" shall cover and signify the ruling of the grooves by plastic deformation, by cutting, polishing or the like.

Figure 4:
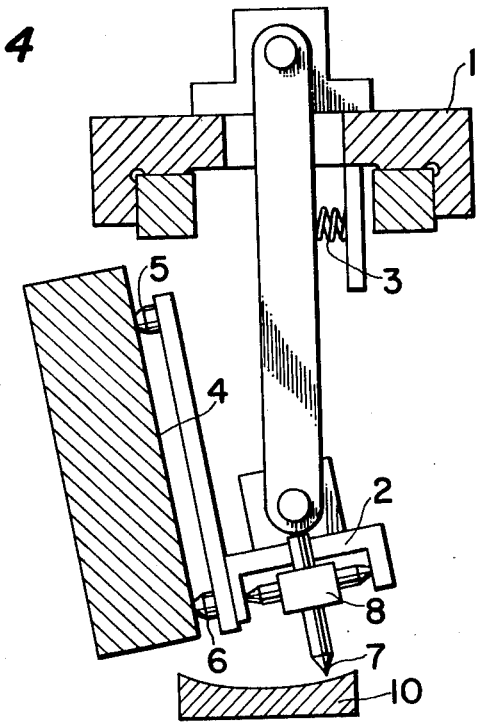
FIG. 4 is an explanatory view of an embodiment of the present invention.

FIG. 4 shows an embodiment of the system in the present invention in which grating grooves are ruled in which a tool for ruling the grating grooves is restrained within a plane inclined by an arbitrary angle relative to a plane lying in contact with one point on the spherical concave of a diffraction grating blank. A tool holder 2 suspended from a tool slide or diamond carriage 1 is pressed through two side elements 5 and 6 against the guide plane of an optical flat (e.g., glass optical flat) 4 inclined by an arbitrary angle by means of a coiled spring 3, etc. It performs reciprocal motions in a direction normal to the plane of the drawing, so as to rule grating grooves in a grating blank 10. A diamond tool 7 is mounted on a jig 8 which is free to rotate with respect to the tool holder 2. Since the extreme end of the tool is always rotated within a plane parallel to the optical flat 4, it is restrained within the same plane parallel to the optical flat 4.

Figure 5A:
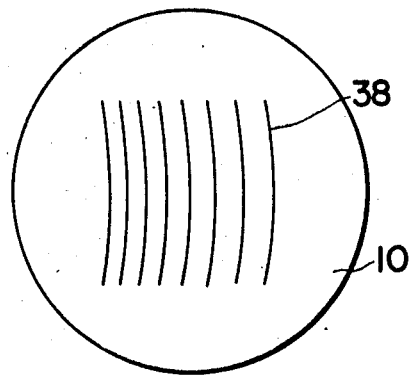
FIGS. 5A and 5B are schematic views which show the concave diffraction grating according to the present invention.

As shown in FIG. 5A, a concave diffraction grating 10 thus obtained has a grating groove 38 formed elliptically as viewed from above the surface. (This holds at $\theta \neq 0$ in the previously mentioned equation. At $\theta = 0$, a rectilinear groove is produced.)

Figure 5B:
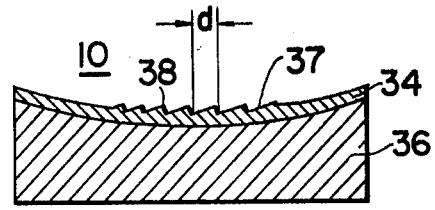

As is shown in FIG. 5B, the grating groove has a groove surface 37 which achieves a high diffraction efficiency in the direction of regularly reflected incident light. The sectional shape of the grating grooves forms, for example, saw-tooth-like grooves. The depth of the groove depends on the wavelength of light. As is illustrated in FIGS. 5A and 5B, the pitch $d$ of the groove varies as a function of the groove position or groove number as given by the above equation. The grating grooves are arranged at varying pitches.

With the concave diffraction grating according to the present invention as explained above, the diffracted light of an arbitrary specific wavelength can be formed into an image at an arbitrary position, completely stigmatically and at high diffraction efficiency.

The grating blank is composed of a substrate 36 (of, for example, glass, ceramics, etc.) which is coated (by, for example, the vacuum evaporation) with a metal film 34 (of, for example, aluminum, gold, etc.) having a high reflection factor for the wavelength of light for use. The illustrated grating blank, however, is not restrictive, but the substrate 36 and the metal film 34 may be integral or of an identical material.

Figure 6:
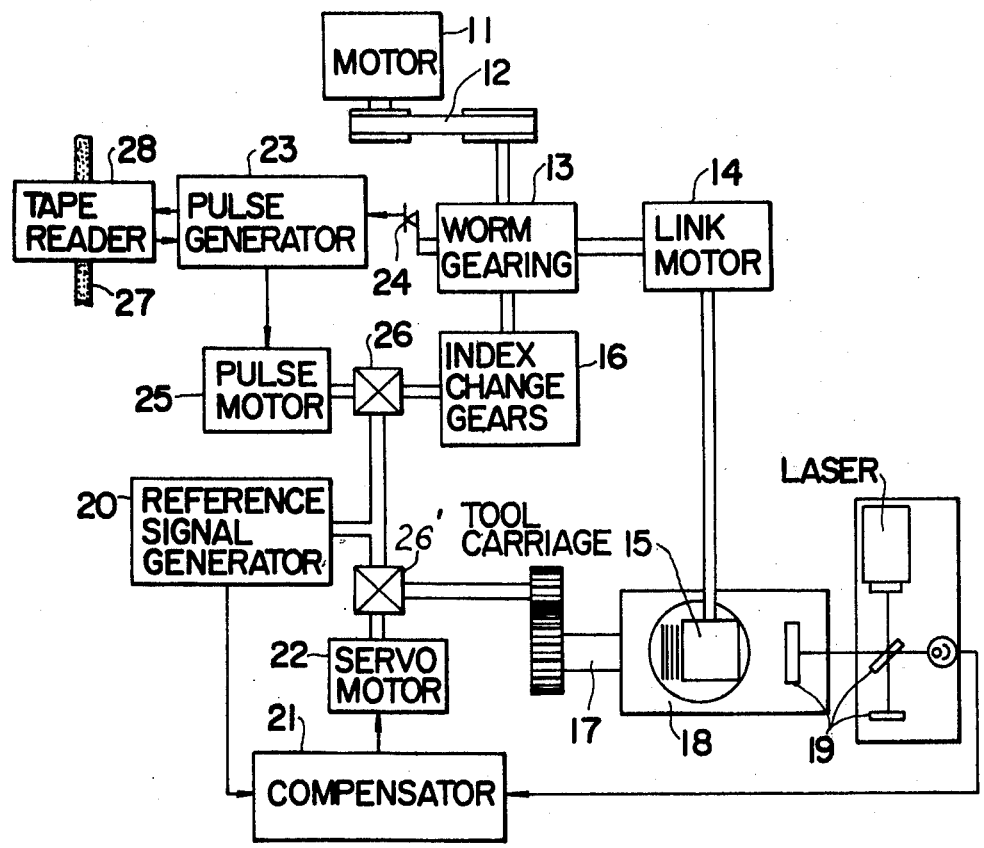
FIG. 6 is a control flow chart in an embodiment of the present invention.

FIG. 6 shows an embodiment of the grating blank positioning control which effects the translation for an arbitrary and variable pitch groove spacing. Rotation transmitted from a main motor (for example, D.C. motor) 11 through a belt 12 to the body of the system is decelerated by a worm gearing 13. The low-speed side rotation is transmitted to a link motion 14 for reciprocating a tool, and reciprocates a tool slide 15. As stated previously, the diamond tool mounted on the tool carriage 15 effects a ruling restrained within a plane inclined at an arbitrary angle. On the other hand, the highspeed side rotation of the worm gear 13 is subjected by grating spacing-indexing change gears 16 to a speed change corresponding to the groove spacing $d_0$ at the middle part of the diffraction grating. Element 16 corresponds to a known spur gear, which by changing the gear ratio 2/1, 1/1, ½, etc., the respective average spacing, 1/600, 1/1200, 1/2400 mm. etc. are established thereto. After a further speed reduction, it rotates a feed screw 17 for driving a grating blank. The rotation of the feed screw 17 is transformed into the feed of a blank carriage 18, and a specific groove spacing is obtained. At the rear end part of the blank carriage, there is installed a laser interferometer 19 (employing a laser beam such as a He—Ne laser beam). The state of movement of the blank carriage is monitored by a fringe signal of an interference fringe. On the other hand, a two-phase generator (or reference signal generator) 20 is rotated by a rotation taken out from the groove spacing-indexing change gears 16. The number of revolutions of the generator 20 is set so that an electric signal obtained by the rotation of the generator may become equal in frequency to the laser interferometer signal in the ideal feed state. The electric signal is made a reference signal. A fluctuation in the phase difference between the reference signal and the laser interferometer signal after photoelectric conversion corresponds to a translation error of the blank carriage. A compensator 21 consisting of an amplifier, amplitude equalizer, phase compensator, and servo motor, (see J.O.S.A. 41(1951) 495 or 45(1955) detects the fluctuation of the phase difference between both the signals, and rotates a translation correcting servomotor 22, the output of which is transmitted to a differential gear 26', so that the phase difference between both the signals may be always kept constant. Thus, the mechanical translation error of the blank carriage is corrected.

In this case, by changing the number of revolutions of the two-phase generator 20 in accordance with the rule number or rule position, the blank carriage attains unequal spacing translations after the modulated reference signal. In conformity with a program set beforehand and at every switching operation of a switch 24 periodically made for one rule, a pulse generator 23 generates a set number of pulses, to rotate a pulse motor 25 by a predetermined angle of rotation. The rotation of the pulse motor 25 is transmitted to a differential gear 26 of the blank translating gearing, and modulates the frequency of the reference signal.

Figure 7:
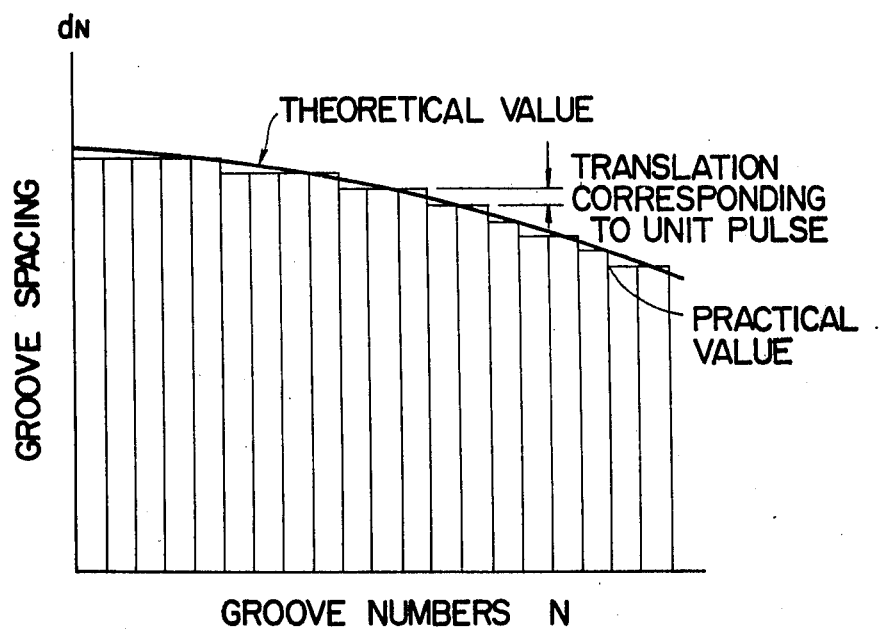
FIG. 7 is a diagram which illustrates the relationship between the groove number and the groove spacing in an embodiment of the present invention.

In theory, the groove spacings of the concave diffraction grating effecting the stigmatic image formation change continuously as illustrated in FIG. 7. In practical use, however, the ruling is carried out in such a way that the grating groove spacings are changed stepwise by selecting a sufficiently small value (for example, 0.1 A) for the amount of translation corresponding to the unit turning angle of the pulse motor. The changes of the groove spacings differ in dependence on the image forming conditions of the concave diffraction grating to-be-manufactured. The manufacture of the concave diffraction grating which has arbitrary image forming conditions is possible in such way that the relations between groove numbers and groove spacings are evaluated by an electronic computer, etc. in conformity with the image forming conditions of the diffraction grating to-be-manufactured, that the groove numbers and the numbers of pulses for rotating the pulse motor are written into a tape 27 (in FIG. 6), and that the pulse motor is rotated according to the instructions of the tape by a tape reader 28.

By way of example, consider a case where a diffraction grating having a radius of curvature of 1 m is ruled with 600 grating grooves per mm. Assuming that the difference between the maximum and minimum groove spacings for 30,000 grating grooves is $2.56 \times 10^{-2}$ $\mu$, the stigmatic image if formed at a wavelength of 5,461 A.

The groove spacing control has been described chiefly on the concave diffraction grating. Also, in the case of a plane diffraction grating, it is possible to change groove spacings and perform ruling by the same method in order to correct aberrations of a spectrometer constructed of lenses, a concave mirror, etc.

While the diffraction grating manufactured by a diffraction grating engraving machine (ruling engine) was directly employed for spectral uses in the early stage, mass production by duplication has become possible due to advancements in reproduction techniques in recent years. This applies also to the case of the concave diffraction grating, and products for use in the general spectral apparatus are replica diffraction gratings which have undergone duplication processes for several generations from a master diffraction grating ruled by the ruling engine. In this case, the master diffraction grating need not always be concave, but it may also be one in which grating grooves are ruled on a convex surface.

Figure 8:
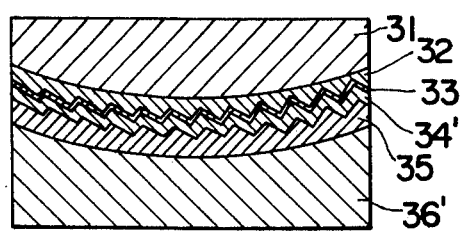
FIG. 8 is a view which shows another embodiment of the present invention.

FIG. 8 illustrates an embodiment of the present invention in which, using the above method, a replica of a concave diffraction grating is manufactured from a master diffraction grating with grating grooves ruled on a convex sphere. The master diffraction grating fabricated by the ruling engine is such that a metal film 32 is formed on a convex sphere 31 of glass by vacuum evaporation and grating grooves are ruled on the surface of the metal film 32 by the foregoing method. A very thin oil film 33, such as silicon oil, diffusion pump oil, etc. as a parting agent is formed on the surface of the master diffraction grating, and a metal film 34' constituting the surface of the replica diffraction grating is formed thereon by vacuum evaporation. A glass substrate 36' having a concave spherical shape is brought into pressed contact with the metal film 34' through adhesives 35 of plastic, epoxy, etc. which are not yet cured. After curing the adhesives, the constituents of the master and replica diffraction gratings are separated with the boundary at the parting agent oil film 33. Thus, a concave diffraction grating is manufactured.

Where a master diffraction grating is concave, a concave diffraction grating having the same surface shape as that of the master diffraction grating is manufactured in such a way that the master diffraction grating is once transferred onto a convex substrate, whereupon the convex replica is again transferred onto a concave substrate.

By effecting such transfer and replication processes for several generations, a number of replica diffraction gratings are fabricated from the same master diffraction grating.

With the method stated above, it becomes possible to manufacture a concave diffraction grating which can form a completely stigmatic image of the diffracted light of a specified wavelength at an arbitrary position at high diffraction efficiency.

What we claim is:

1. A method of manufacturing a concave diffraction grating comprising the steps of:
   a. providing a grating blank having a concave spherical surface;
   b. positioning a ruling tool in a first plane intersecting said concave spherical surface and perpendicular to a line passing through the center of curvature of said concave spherical surface and a point at which the image of the first-order diffracted light of a predetermined wavelength $\lambda_0$ is formed stigmatically when said light emanates from the center of curvature of said concave spherical surface; and
   c. passing said ruling tool back-and-forth across said concave spherical surface in a plurality of spaced-apart planes, each of said planes being parallel to said first plane and parallel to one another, and each of said planes intersecting said concave spherical surface, to thereby form a plurality of grating grooves in said concave spherical surface.

2. A method accordng to claim 1, wherein each of said grooves is spaced apart from an adjacent groove with a variable groove spacing in accordance with its position in said surface.

3. A method of manufacturing a concave diffraction grating comprising the steps of:
   a. providing a grating blank having a concave spherical surface;
   b. inclining a ruling tool in a first plane intersecting said concave spherical surface, said first plane being inclined at an angle relative to a first line passing through the center of curvature of said concave spherical surface and the vertex of said surface; and
   c. passing said ruling tool back-and-forth across said concave spherical surface in a plurality of spaced-apart lines, each of said planes being parallel to said first plane and parallel to one another, and each of said planes intersecting said concave spherical surface to form a plurality of spaced-apart grooves.

4. A method according to claim 3, wherein each of said planes being orthogonal to a second line passing through said center of curvature and a point at which light emanating from said center of curvature is completely stigmatically formed after reflection from said concave surface.

5. A method according to claim 3, wherein said grooves are ruled with variable spacing in accordance with their position in said surface.

6. A method according to claim 3, wherein step (c) includes the steps of:
   c1. monitoring the mechanical translations of said spaced-apart grooves in said surface with an interferometer and detecting fringe signals therefrom,
   c2. generating a reference signal having a predetermined frequency corresponding to that at which said fringe signal will be generated for ideally spaced grooves.
   c3. changing said reference signal frequency according to the position of the groove on said surface, and
   c4. controlling the mechanical translations of said ruling tool so as to maintain a constant phase difference between said reference signal and said fringe signal.

7. A method of manufacturing a concave diffraction grating comprising the steps of:
   a. providing a grating blank having a concave spherical surface;
   b. positioning a ruling tool in a selected $i^{th}$ plane intersecting said concave spherical surface at a point Pi, said selected $i^{th}$ plane being inclined at an angle $\theta$ relative to a first line passing through the center of curvature A of said surface and the vertex 0 thereof, and said selected $i^{th}$ plane being orthogonal to a second line passing through said center of curvature A and a point B at which the image of first-order diffracted light having a wavelength $\lambda$ and emanating from the center of curvature A is formed completely stigmatically, said point Pi lying on a circle of radius ($\overline{B0} - i\lambda$) having its center at said point B; and
   c. passing said ruling tool back-and-forth across said concave spherical surface in a plurality of spaced-apart planes to rule thereon a plurality of spaced-apart grooves, said planes being parallel to said selected $i^{th}$ plane and parallel to one another and intersecting said concave spherical surface, each of said plurality of planes being inclined at said angle $\theta$ relative to said first line and each of said plurality of planes being orthogonal to said second line.

* * * * *